Patented July 6, 1943

2,323,334

UNITED STATES PATENT OFFICE 2,323,334

ENAMEL COMPOSITION

Henry J. Kauth, Rome, N. Y., assignor to General Cable Corporation, New York, N. Y., a corporation of New Jersey No Drawing. Application July 20, 1942, Serial No. 451,665

15 Claims. (Cl. 260—42)

This invention, like that described in my copending application Serial No. 280,575, filed June 22, 1939, relates to the production of resinous compositions suitable for wire enamels from partially condensed furfuryl alcohol as a base. Prior to my earlier invention to which I have just referred, there was no practicable way, so far as I am aware, of imparting sufficient toughness and flexibility to the furan resins to adapt them for use in the production of wire enamels; and hence, notwithstanding the unusually high degree of hardness, solvent-resistance, chemical inertness, and dielectric properties exhibited by their films, and which in all these respects made them excellently suited to the production of wire enamels, their brittleness was a bar to their use for that purpose. The aim of the present invention, like that of my earlier one, is to provide a furan base resin with the necessary toughness and flexibility for the production of wire enamels and other uses without substantially degrading its other valuable properties.

The present application is a continuation-in-part of my prior application Serial No. 411,493, filed September 19, 1941.

My invention here is based upon the discovery I have made that the furfuryl alcohol condensates described in my earlier application Serial No. 280,575 aforesaid are powerful solvents for the high molecular weight, linear polyamide resins which might have been used to impart toughness and flexibility to the more brittle resins of the furan group but for the fact that, on account of their having so few known solvents, they have been regarded as practically incompatible with most other materials. The polyamide-forming compositions referred to are those described in United States patents, Nos. 2,071,253 and 2,130,948. They are of two general types, namely polymerizable monoaminomonocarboxylic acids and their amide-forming derivatives and mixtures of diamines with dibasic carboxylic acids and the amide-forming derivatives thereof. The word "polymerizable" as used herein is intended to include the condensation reactions in which unimportant by-products such as water are eliminated in the reactions.

For example, high molecular weight, linear polyamides such as are produced by the chemical reaction of pentamethylene diamine or other alkyl diamines with sebacic acid, adipic acid, or other dibasic aliphatic acids, and also those formed by auto-condensation of the condensable monoaminomonocarboxylic acids, form extraordinarily hard and tough films, and in combination with most other resins with which they could be combined would increase the toughness and flexibility of the latter; but the very limited compatibility of these high molecular weight, linear polyamides with other materials and the very high viscosity produced by even small percentages in solution have, up to the present time, constituted a bar to their use for such purpose in most cases. For convenience, these high molecular weight, linear polyamides are hereinafter referred to simply as polyamides.

Applying my discovery of the aforesaid solvent action of furfuryl alcohol condensates, I have found that their solvent action on the polyamides makes the latter compatible in sufficient quantity with said condensates to impart to their resinoid (baked) films a high degree of toughness and flexibility and, indeed, without causing such high viscosity in the enamel solutions as to prevent satisfactory flowing qualities when applied on conventional enameling equipment. This solvent action may be readily observed, for example, by adding furfuryl alcohol condensate to a solution of a polyamide in cresylic acid, whereupon the viscosity of the cresylic acid solution is markedly reduced.

I have also found that the enamel produced by this combination has a high temperature susceptibility in relation to viscosity with the result that even a moderate heating causes a sharp drop in its viscosity, and that the degree to which this property is operative is a rather unique phenomenon peculiar to partially condensed furfuryl alcohol. Now this property is particularly advantageous in wire enamels since it allows a still further reduction of their viscosity for application to the wire, to obtain which one has only to keep them at an elevated temperature, say at 130° to 140° F. Without the addition of the furfuryl alcohol condensate, solutions of the polyamides in cresylic acid, for example, show only a very slight decrease in viscosity when heated over the allowable temperature range, that is, up to 130° to 140° F. In contrast to this, the reduction of viscosity which is imparted by the furfuryl alcohol condensate will be clear from the following example: An enamel containing 36% solids which are composed of 80% furfuryl alcohol condensates and 20% polyamides may be placed in a bubble tube and the time required for a bubble to traverse the tube when inverted measured at 60° F. and again at 130° F. At 60° F. the time required is about 11.0 seconds; and at 130° F. is about 2.4 seconds. This shows that the viscosity of the enamel is reduced to less than one-quarter of its original viscosity when the temperature is raised from 60° F. to 130° F. Since the temperature of such enamels can be safely held at 130° F. during application, it is possible to take advantage of this greatly reduced viscosity at the higher temperature to increase somewhat their solids content and obtain a better film "build-up."

One convenient method of preparing the furfuryl alcohol condensate is to charge 1000 parts (by weight) of furfuryl alcohol into a kettle equipped for both heating and cooling, and 50 parts of a catalyst such as a 2% sulphuric acid solution (in diacetone) added to the cold alcohol while thorough mechanical agitation is effected with a stirrer. The exothermic reaction which ensues causes the temperature to rise without external application of heat. At 45° C. to 50° C. this temperature rise is checked and the temperature is held within this range by intermittent use of the cooling coil for a period of one hour. The temperature is then allowed to rise to 70° C. for the duration of the reaction. Alternate use of heating and cooling is generally necessary to maintain the reacting mass at 70° C. As condensation proceeds, a regular increase in the density of the material takes place; and this provides a simple means of controlling the process. For, after the batch has reached 70° C., the stirrer may be stopped at regular intervals and a heavy Baumé hydrometer inserted into the materials. The first Baumé reading is generally of the order of 15° Baumé at 70° C. A regular increase takes place until, after about two and a half hours, the density of 70° C. is 17.4° Baumé. At this point the reaction is stopped and the condensate stabilized by neutralizing the catalyst with an excess of triethanolamine, about nine to ten parts being used.

These condensates may also be prepared by dissolving the furfuryl alcohol in water, acidifying and heating until the condensates have the desired densities, and neutralizing with a base to stop the condensation.

The heavy liquid condensate is dehydrated by heating at 120° C., with stirring, and is allowed to stand in order to settle out the insoluble matter formed in the condensation. The clear upper portion is then separated and thinned with a solvent consisting preferably of 75% coal tar naphtha and 25% cresylic acid. The amount of the naphtha-cresol solvent used is preferably such that the furfuryl alcohol condensate solution will contain about 50% solids. This solution is then filtered.

To make the enamel, this furfuryl alcohol condensate solution may be combined with a 10% solution of the polyamide in cresylic acid. A 10% solution of the polyamide in cresylic acid is preferred to higher concentration because it is less viscous and more easily handled. An illustrative example of this compounding of the enamel is the following:

| | Parts by weight |
|---|---|
| (1) Furfuryl alcohol condensate | 80 |
| Naphtha-cresylic acid solvent (25% cresylic acid) | 80 |
| (2) Polyamide plastic | 20 |
| Cresylic acid | 180 |

Solutions (1) and (2) are mixed together to form the enamel. The preparation of the polyamide-cresylic acid solution is facilitated by heating at 110–120° C. and stirring continuously. For application to wire the enamel is thinned further with a solvent consisting of coal tar naphtha and cresylic acid containing 40% to 50% cresylic acid and the temperature of the enamel is preferably maintained at about 130° F. The use of a somewhat higher percentage of polyamide in the enamel provides even greater flexibility of the resinoid film coating.

It is not necessary that the condensation of the furfuryl alcohol be carried to precisely 17.4° Baumé. I have found, for example, that satisfactory enamels may be provided by combining the polyamides with furfuryl alcohol condensates carried to densities of 14.8°, 15.5°, 16.1°, 16.5°, 17°, and 17.4° Baumé respectively. Some differences are apparent in the use of the various enamels so prepared, the most noticeable being the tendency to loss by volatilization in the baking oven where densities of a very low degree of condensation are used, and to loss of viscosity-reducing action on the polyamides where products of a high degree of condensation are used. Nevertheless, the degree of condensation may be spread over a considerable range; and the precise method of coating used and type of equipment employed therefor will often determine the degree of condensateion which is most satisfactory.

It is not necessary in preparing the furfuryl alcohol condensate to use furfuryl alcohol alone since other compounds, such as furfural, which contain the furan nucleus, may be mixed with the alcohol to reduce expense; but there would be no advantage in this partial replacement of the alcohol other than to reduce expense. Neither is it necessary that the polyamides be added to the furfuryl alcohol after rather than before the condensation of the latter, although that procedure makes the handling of the materials easier. Hence, while the modifying or flexibilizing material may be added to the furfuryl alcohol in the beginning or at any stage prior to the completion of the condensation of the alcohol, there is little to be gained by so doing.

I claim:

1. The method of compounding an enamel having a furan resin base and containing a flexibilizing agent to improve its qualities for use as a wire coating, which method comprises condensing furfuryl alcohol to a density not substantially less than 14.8° nor substantially greater than 17.4° Baumé at 70° C., stopping the further condensation thereof, and adding thereto a syntheteic linear polyamide which is a reaction product of a linear polyamide-forming composition comprising a member of the class consisting of polymerizable monoaminomonocarboxylic acids and a mixture of a diamine and a dibasic carboxylic acid.

2. The method of compounding an enamel having a furan resin base and containing a flexibilizing agent to improve its qualities for use as a wire coating, which method comprises condensing furfuryl alcohol to a density not substantially less than 14.8° nor substantially greater than 17.4° Baumé at 70° C., stopping the further condensation thereof, and adding thereto a synthetic linear polyamide which is a reaction product of a polymerizable monoaminomonocarboxylic acid.

3. The method of compounding an enamel having a furan resin base and containing a flexibilizing agent to improve its qualities for use as a wire coating, which method comprises condensing furfuryl alcohol to a density not substantially less than 14.8° nor substantially greater than 17.4° Baumé at 70° C., stopping the further condensation thereof, and adding thereto a synthetic linear polyamide which is a reaction product of a mixture of a diamine and a dibasic carboxylic acid.

4. The method of compounding an enamel having a furan resin base and containing a flexibilizing agent to improve its qualities for use as a wire coating, which method comprises condensing furfuryl alcohol to a density not substantially less than 14.8° nor substantially greater than 17.4° Baumé at 70° C., stopping the further condensation thereof, and adding thereto a solution of a synthetic linear polyamide which is a reaction product of a linear polyamide-forming composition comprising a member of the class consisting of polymerizable monoaminomonocarboxylic acids and a mixture of a diamine and a dibasic carboxylic acid.

5. The method of compounding an enamel having a furan resin base and containing a flexibilizing agent to improve its qualities for use as a wire coating, which method comprises condensing furfuryl alcohol to a density not substantially less than 14.8° nor substantially greater than 17.4° Baumé at 70° C., stopping the further condensation thereof, and adding thereto a solution of a synthetic linear polyamide which is a reaction product of a polymerizable monoaminomonocarboxylic acid.

6. The method of compounding an enamel having a furan resin base and containing a flexibilizing agent to improve its qualities for use as a wire coating, which method comprises condensing furfuryl alcohol to a density not substantially less than 14.8° nor substantially greater than 17.4° Baumé at 70° C., stopping the further condensation thereof, and adding thereto a solution of a synthetic linear polyamide which is a reaction product of a mixture of a diamine and a dibasic carboxylic acid.

7. The method of compounding an enamel having a furan resin base and containing a flexibilizing agent to improve its qualities for use as a wire coating, which method comprises condensing furfuryl alcohol with the aid of a catalyst to a density of not substantially less than 14.8° nor substantially more than 17.4° Baumé at 70° C., neutralizing the catalyst to stabilize the condensate, and adding thereto a synthetic linear polyamide which is a reaction product of a linear polyamide-forming composition comprising a member of the class consisting of polymerizable monoaminomonocarboxylic acids and a mixture of a diamine and a dibasic carboxylic acid.

8. The method of compounding an enamel having a furan resin base and containing a flexibilizing agent to improve its qualities for use as a wire coating, which method comprises condensing furfuryl alcohol with the aid of a catalyst to a density of not substantially less than 14.8° nor substantially more than 17.4° Baumé at 70° C., neutralizing the catalyst to stabilize the condensate, and adding thereto a synthetic linear polyamide which is a reaction product of a polymerizable monoaminomonocarboxylic acid.

9. The method of compounding an enamel having a furan resin base and containing a flexibilizing agent to improve its qualities for use as a wire coating, which method comprises condensing furfuryl alcohol with the aid of a catalyst to a density of not substantially less than 14.8° nor substantially more than 17.4° Baumé at 70° C., neutralizing the catalyst to stabilize the condensate, and adding thereto a synthetic linear polyamide which is a reaction product of a mixture of a diamine and a dibasic carboxylic acid.

10. An insulating wire-enamel composition for conductors comprising furfuryl alcohol condensate of a density not substantially less than 14.8° nor substantially greater than 17.4° Baumé at 70° C., and a synthetic linear polyamide which is a reaction product of a linear polyamide-forming composition comprising a member of the class consisting of polymerizable monoaminomonocarboxylic acids and a mixture of a diamine and a dibasic carboxylic acid.

11. An insulating wire-enamel comprising for conductors comprising furfuryl alcohol condensate of a density not substantially less than 14.8° nor substantially greater than 17.4° Baumé at 70° C., and a synthetic linear polyamide which is a reaction product of a polymerizable monoaminomonocarboxylic acid.

12. An insulating wire-enamel composition for conductors comprising furfuryl alcohol condensate of a density not substantially less than 14.8° nor substantially greater than 17.4° Baumé at 70° C., and a synthetic linear polyamide which is a reaction product of a mixture of a diamine and a dibasic carboxylic acid.

13. As an article of manufacture, a metallic wire having an insulating and protective coating consisting of the infusible residue formed by baking a resinous composition comprising furfuryl alcohol condensate of a density not substantially less than 14.8° nor substantially greater than 17.4° Baumé at 70° C., and a synthetic linear polyamide which is a reaction product of a linear polyamide-forming composition comprising a member of the class consisting of polymerizable monoaminomonocarboxylic acids and a mixture of a diamine and a dibasic carboxylic acid.

14. As an article of manufacture, a metallic wire having an insulating and protective coating consisting of the infusible residue formed by baking a resinous composition comprising furfuryl alcohol condensate of a density not substantially less than 14.8° nor substantially greater than 17.4° Baumé at 70° C., and a synthetic linear polyamide which is a reaction product of a polymerizable monoaminomonocarboxylic acid.

15. As an article of manufacture, a metallic wire having an insulating and protective coating consisting of the infusible residue formed by baking a resinous composition comprising furfuryl alcohol condensate of a density not substantially less than 14.8° nor substantially greater than 17.4° Baumé at 70° C., and a synthetic linear polyamide which is a reaction product of a mixture of a diamine and a dibasic carboxylic acid.

HENRY J. KAUTH.

CERTIFICATE OF CORRECTION.

Patent No. 2,323,334. July 6, 1943.

HENRY J. KAUTH.

It is hereby certified that error appears in the printed specification of the above numbered patent requiring correction as follows: Page 2, first column, line 35, for "of 70°" read --at 70°--; and second column, line 50, claim 1, for "syntheteic" read --synthetic--; page 3, second column, line 20, claim 11, for "comprising" read --composition--; and that the said Letters Patent should be read with this correction therein that the same may conform to the record of the case in the Patent Office.

Signed and sealed this 17th day of August, A. D. 1943.

(Seal)

Henry Van Arsdale,
Acting Commissioner of Patents.